United States Patent
Huddleston et al.

(10) Patent No.: US 7,562,054 B2
(45) Date of Patent: Jul. 14, 2009

(54) METHOD AND APPARATUS FOR AUTOMATED FEATURE SELECTION

(75) Inventors: David E. Huddleston, Lakewood, OH (US); Ronald J. Cass, Cleveland Heights, OH (US); Zhuo Meng, Broadview Heights, OH (US); Yoh-Han Pao, Cleveland Heights, OH (US); Qian Yang, Broadview Heights, OH (US); Xinyu Mao, Sagamore Hills, OH (US)

(73) Assignee: Computer Associates Think, Inc., Islandia, NY (US)

( * ) Notice: Subject to any disclaimer, the term of this patent is extended or adjusted under 35 U.S.C. 154(b) by 320 days.

(21) Appl. No.: 10/888,882

(22) Filed: Jul. 9, 2004

(65) Prior Publication Data

US 2005/0049913 A1    Mar. 3, 2005

Related U.S. Application Data

(60) Provisional application No. 60/486,734, filed on Jul. 11, 2003.

(51) Int. Cl.
*G06F 15/18* (2006.01)
*G06N 3/00* (2006.01)
*G06N 3/12* (2006.01)

(52) U.S. Cl. .............................. 706/13; 706/14; 706/26
(58) Field of Classification Search ................... 706/13, 706/26
See application file for complete search history.

(56) References Cited

U.S. PATENT DOCUMENTS

| 6,594,649 B2 * | 7/2003 | Sadakuni | 706/14 |
| 6,601,053 B1 | 7/2003 | Schaffer et al. | 706/26 |
| 6,886,003 B2 * | 4/2005 | Kishi | 706/25 |

OTHER PUBLICATIONS

Percy et al, "A Guided Evalutionary Computation Technique as Function Optimizer", IEEE 1994.*
David Hand et al., Principles of Data Mining, 2001, MIT 50, 57, 58, 266, 267, 268, 476, 477.*

(Continued)

*Primary Examiner*—Joseph P Hirl
(74) *Attorney, Agent, or Firm*—Baker Botts L.L.P.

(57) ABSTRACT

A method for automated feature selection is provided. One or more initial sets of features are generated and evaluated to determine quality scores for the feature sets. Selected ones of the feature sets are (i) chosen according to the quality scores and modified to generate a generation of modified feature sets, (ii) the modified feature sets are evaluated to determine quality scores for the modified feature sets, and (i) and (ii) are repeated until a modified feature set is satisfactory.

30 Claims, 4 Drawing Sheets

OTHER PUBLICATIONS

Yip P P et al. "Combinatorial Optimization with use of Guided Evolutionary Simulated Annealing" IEEE Transactions on Neural Networks, IEEE Inc., New York, US vol. 6, No. 2, Feb. 1, 1995 pp. 290-295, XP000492663 ISSN: 1045-9227.

Siedlecki W et al. "On Automatic Feature Selection" International Journal of Pattern Recognition and Artificial Intelligence, Singapore, XX, vol. 2, No. 2, Jun. 1988, pp. 197-220, XP008034768 ISSN: 0218-0014.

Michalewicz Z et al. "Evolutionary Computation Techniques and Their Applications" Intelligent Processing Systems, 1997. ICIPS'97, 1997 IEEE International; Conference on Beijing, China Oct. 28-31, 1997, New York, NY, USA, IEEE, US Oct. 28, 1997, p. 14-25, XP010276493 ISBN: 0-7803-4253-4.

Summons to attend oral proceedings pursuant to Rule 71(1) EPC; Reference HCD/J00048488EP; 6 pages, May 3, 2007.

S. Theodoridis and K. Koutroumbas—*"Pattern Recognition"*, Chapter 5. "Feature Selection", Section 5.6. "Feature Subset Selection", Academic Press, 1999 (XP-002280745), 1999.

\* cited by examiner

FIG. 3

| Description | # features | Train Score | Test Score |
|---|---|---|---|
| GAFS run 1 – ancestor 0 | 58 | 91.36 | 85.18 |
| GAFS run 1 – ancestor 1 | 112 | 87.43 | 75.02 |
| GAFS run 1 – ancestor 2 | 83 | 84.84 | 95.76 |
| GAFS run 1 – ancestor 3 | 78 | 88.78 | 93.2 |
| GAFS run 1 – ancestor 4 | 86 | 83.87 | 90.62 |
| GAFS run 1 – best configuration | 15 | 92.86 | 94.98 |
| GAFS run 2 – best configuration | 13 | 91.32 | 96.26 |

METHOD AND APPARATUS FOR AUTOMATED FEATURE SELECTION

CROSS-REFERENCE TO RELATED APPLICATION

This application claims the benefit of commonly-owned U.S. Provisional Application No. 60/486,734, filed Jul. 11, 2003 and entitled "GESA ASSISTED FEATURE SELECTION".

TECHNICAL FIELD

This application relates to system modeling, pattern recognition and data mining. In particular, the application relates to automated feature selection for system modeling, pattern recognition, data mining, etc.

DESCRIPTION OF RELATED ART

Feature selection is of theoretical interest and practical importance in the practice of pattern recognition and data mining. Data objects typically can be described in terms of a number of feature values. Some features may be categorical and thus may be expanded to make each category a separate feature. Some features may be time series and thus may need time lagged values in addition to or in place of the current values. In practice, even a seemingly small problem may actually have a large number of features.

The task then is to determine what feature or subset of features is to be used as the basis for decision making in classification and for other related data mining tasks such as modeling. Although objects or data entities may be described in terms of many features, some features may be redundant or irrelevant for specific tasks, and therefore instead may serve primarily as a source of confusion. It is not necessarily true that a larger number of features provides better results in task performance. Inclusion of irrelevant features increases noise and computational complexity. For neural net modeling, it is widely accepted that for the same training error, a model with a small number of input features can generalize better than one with a larger number of input features, or in other words, the former is of higher quality than the latter. Therefore, feature selection is a matter of considerable interest and importance in multivariate data analysis.

For example, when a specific behavior or output of a specific system is modeled, it is typically desirable to include only parameters that contribute to the modeled system behavior and not other parameters which contribute to other behaviors of the system but are not particularly relevant to the specific modeled behavior.

Since the number of possible different groupings of features is combinatorial, i.e. $2^n$ groupings for a set of n features, straightforward exhaustive search methods such as breadth-first, depth-first, or A* cannot be applied effectively. Many methods have been proposed involving or based on neural networks, genetic algorithms, fuzzy sets, or hybrids of those methodologies.

Traditionally, feature selection is mostly associated with classification and different methods may be applied, and even neural networks, genetic algorithm, etc., may be used in the process of carrying out the feature selection. For example, one may analyze the weights in a neural network to choose features with small weight for removal. In another case, one may use a genetic algorithm tool to carry out feature selection based on multiple correlation.

With wider and wider use of computer models of systems, such as those using neural net technologies, the feature selection process is often carried out in a setting of creating an optimal (or at least better) model of the system given an available set of features, especially when categorical features or time lagged features are present.

The disclosures of the following publications in their entireties are hereby incorporated by reference into this application in order to more fully describe the state of the art as known to those skilled therein as of the date of the invention described and claimed herein;

R. Battiti, "Using mutual information for selecting features in supervised neural net learning", *IEEE Transactions on Neural Networks*, Vol. 5, No. 4, 1994;

M. J. A. Berry and G. Linoff, *Data Mining Techniques for Marketing, Sales, and Customer Support*, John Wiley and Sons, 1997;

F. Z. Brill, et. al., "Fast genetic selection of features for neural network classifiers", *IEEE Transactions on Neural Networks*, Vol. 3, No. 2, 1992;

C. Gao, et. al., "A novel approach to intelligent scheduling based on fuzzy feature S election and fuzzy classifier", In *Proceedings of the 38th Conference on Decision & Control*, Phoenix, Ariz. USA, December 1994;

N. Chaikla and Y. Qi. "Genetic Algorithms in Feature Selection". In *IEEE International Conference on Systems, Man, and Cybernetics*, pages V 538-540, IEEE, October 1999;

C. Guerra-Salcedo et. al., "Fast and Accurate Feature Selection Using Hybrid Genetic Strategies", In *CEC-1999*, 1999;

T. Masters, *Practical Neural Network Recipes in C++*, Academic Press, 1993;

R. Setiono and H. Liu, "Neural-Network Feature Selector", *IEEE Transactions on Neural Networks*, Vol. 8, No. 3, 1997;

H. Vafaie and I. Imam, "Feature Selection Methods: Genetic Algorithms vs. Greedy-like Search", In *Proceedings of the International Conference on Fuzzy and Intelligent Control Systems*, 1994; and P. D. Wasserman, *Advanced Methods in Neural Computing*, Van Nostrand Reinhold, 1993.

SUMMARY

The application provides methods and apparatuses for automated feature selection. In one embodiment, an apparatus includes a feature set generation module, a feature set evolution module, a feature set scoring module and an optimization module. The feature set generation module selects an initial set of features from a plurality of available features. The feature set evolution module modifies a feature set to generate one or more modified feature sets. The feature set scoring module evaluates a selected feature set (that is, one of the initial feature sets or modified feature sets) to determine a quality score for the selected feature set. The optimization module drives the feature set generation module, feature set evolution module and feature set scoring module to obtain a satisfactory feature set.

A method for automated feature selection, according to one embodiment, includes (a) generating one or more initial sets of features and evaluating the initial feature sets to determine quality scores for the initial feature sets, (b) choosing selected ones of the feature sets according to the quality scores and modifying the selected feature sets to generate a generation of modified feature sets, (c) evaluating the modified feature sets to determine updated quality scores for the modified feature sets, and (d) repeating (b) and (c) until a modified feature set is satisfactory.

According to another embodiment, a method for automated feature selection includes generating one or more initial sets of features, evaluating the initial feature sets to determine quality scores for the initial feature sets, selecting one or more of the feature sets according to the quality scores, modifying the selected feature sets to generate a generation of modified feature sets, and evaluating the modified feature sets to determine updated quality scores for the modified feature sets.

BRIEF DESCRIPTION OF THE DRAWINGS

The features of the present application can be more readily understood from the following detailed description with reference to the accompanying drawings wherein:

FIG. 3 shows a table of results obtained from a study of an exemplary problem.

DETAILED DESCRIPTION

This application provides tools (in the form of methodologies, apparatuses and systems) for automated feature selection. The tools may be embodied in one or more computer programs stored on a computer readable medium and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1A:
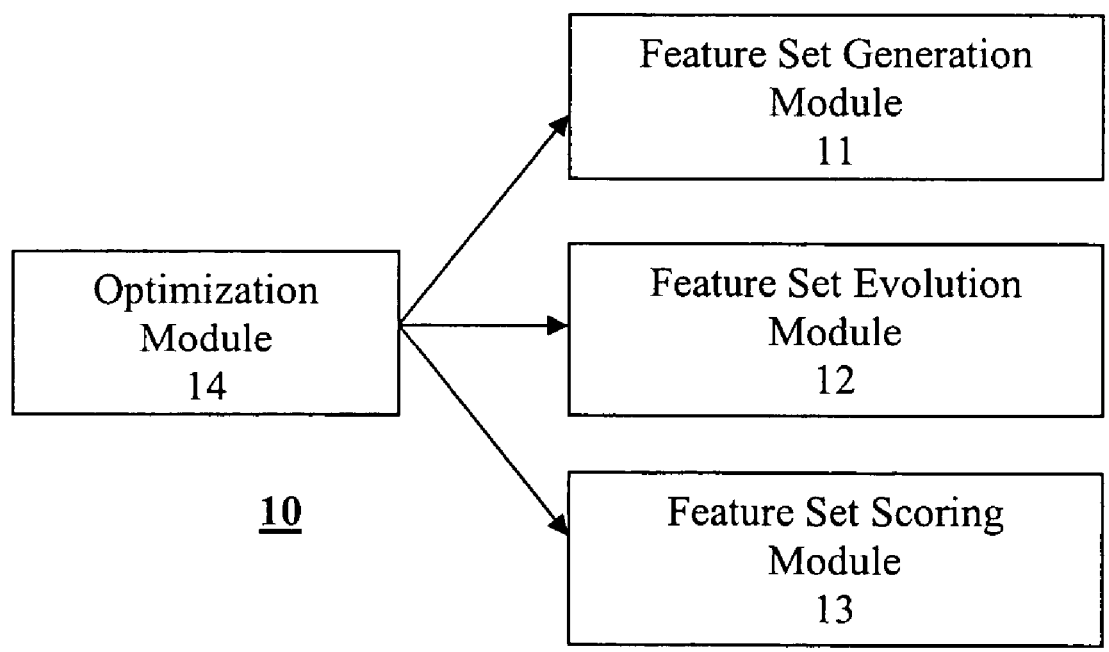
FIG. 1A shows a schematic diagram of an apparatus for automated feature selection, according to an embodiment of the present application.
Figure 1B:
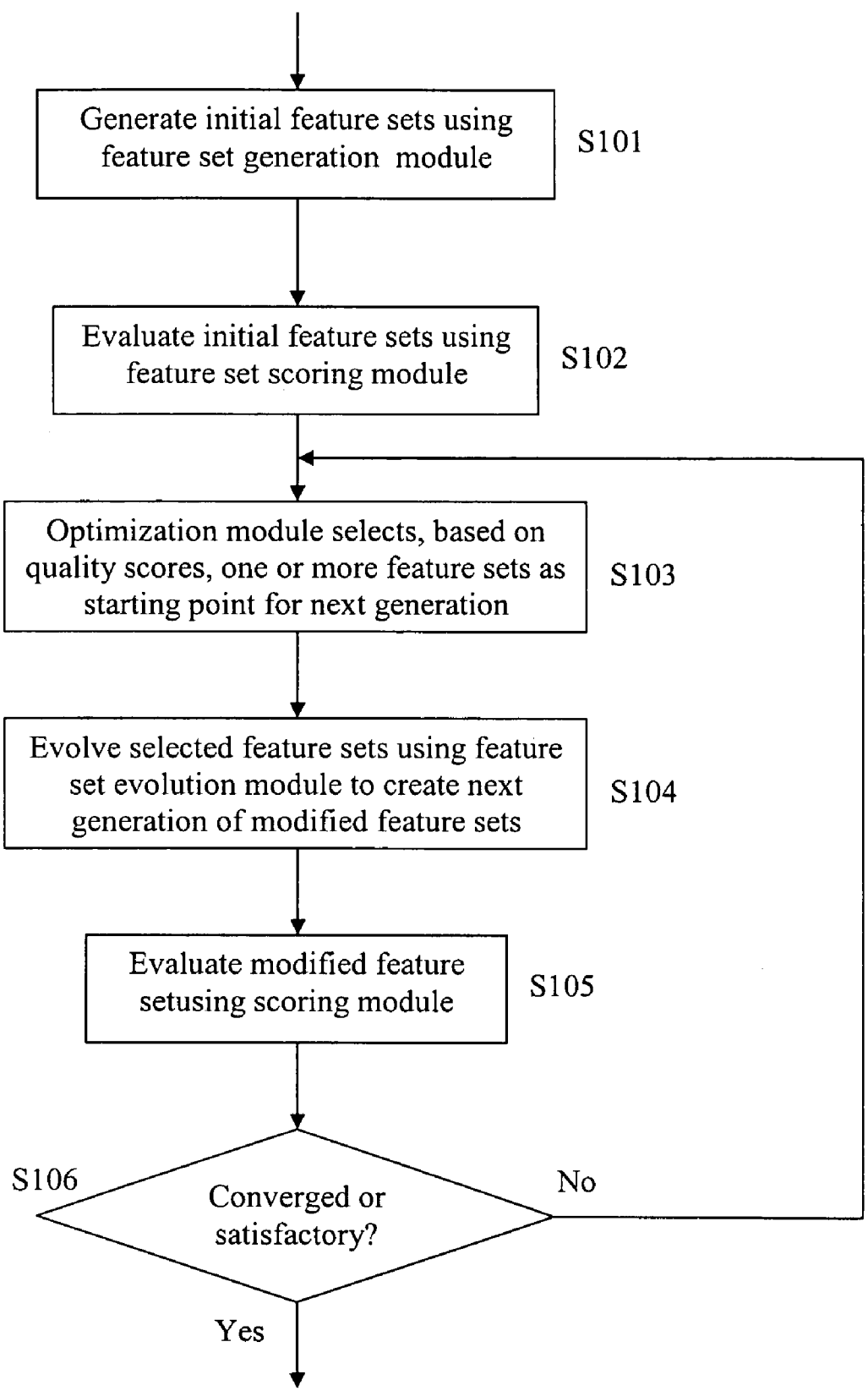
FIG. 1B shows a flow chart of a method for automated feature selection, according to one embodiment of the present application.

An apparatus and a method for automated feature selection, according to an embodiment of this application, is described below with reference to FIGS. 1A and 1B. Apparatus 10 includes a feature set generation module 11, a feature set evolution module 12, a feature set scoring module 13 and an optimization module 14. The feature set generation module 11 selects an initial set of features from a plurality of available features. The feature set evolution module 12 modifies a feature set to generate one or more modified feature sets. The feature set scoring module 13 evaluates a selected feature set (an initial feature set or modified feature set) to determine a quality score for the selected feature set. The optimization module 14 drives the feature set generation module 11, feature set evolution module 12 and feature set scoring module 13 to obtain a satisfactory feature set.

The feature set generation module 11 can generate the initial set of features based on heuristics, by using rules, randomly and/or by using results from a previous feature selection run as a starting point.

The feature set evolution module 12 can apply evolution rules and/or a parameter corresponding to a desired amount of change, to generate the modified feature sets. The feature set evolution module can generate at least one of the modified feature sets by adding or removing one or more features and/or time lags.

The optimization module 14 can instruct the feature set generation module 11 to generate the initial sets of features, and instruct the feature set evolution module 12 to generate another generation of feature sets based on the quality scores of parent feature sets. The optimization module can select one or more of the feature sets to be modified by the feature set evolution module, in order to generate the one or more modified feature sets. The optimization module can drive the feature set evolution module to generate additional modified feature sets, until the quality score of a modified feature set is a satisfactory value or until the quality score of a modified feature set converges. The satisfactory feature set typically has a satisfactory associated quality score.

In the method for automated feature selection, the feature set generation module 11 initially generates one or more initial sets of features (step S101). The feature set scoring module 13 evaluates the initial feature sets to determine quality scores for the initial feature sets (step S102). The optimization module 14 selects one or more of the feature sets according to the quality scores (step S103). The feature set evolution module 12 modifies the selected feature sets to generate a generation of modified feature sets (step S104). The feature set scoring module 13 evaluates the modified feature sets to determine updated quality scores for the modified feature sets (step S105). Steps S103 through S105 can be repeated (S106, No) until a modified feature set is satisfactory (S106, Yes).

At least one of the initial sets of features can be selected randomly, based on heuristics, using results from a previous feature selection run as a starting point, and/or using rules. Similarly, at least one of the modified feature sets is generated by applying evolution rules and/or by using heuristics. A parameter corresponding to a desired amount of change can also be applied, and/or one or more time lags and/or features can be added or removed, to generate at least one of the modified feature sets.

Generally, a modified feature set can be deemed to be satisfactory, if the quality score of the modified feature set is a satisfactory value or if the quality score of the modified feature set converges.

At least one of the modified feature sets can be generated using Guided Evolutionary Simulated Annealing assisted feature selection (discussed below).

The tools of this disclosure can be used for optimization of input features for model generation, and can be adapted to automatically select a group of features (for example, features with nominal values and features having time lags from available ones), so as to achieve a model of better quality.

In real-world modeling problems there is often more data available than is necessary and/or desirable to use when modeling a physical or procedural system. According to some numerical modeling techniques, it is an objective that the model input feature set is both effective in terms of predictive accuracy, and parsimonious in order to conserve computing resources. A typical strategy is to utilize statistical tools to look for correlation between candidate inputs and outputs, followed by trial and error to refine the set of inputs. The measure of model effectiveness might be predictive error or $R^2$ against a validation data set. Other generic objective functions can be used in place of $R^2$. Vertical domain specific methods of scoring model effectiveness can of course be employed instead. In addition, various transformations of the raw candidate inputs can often improve model accuracy. An example might be transforming a date feature to the day-of-the week associated with that date. This process becomes exponentially more difficult for time series problems (for example, stock market modeling), where time-lagged values of the candidate inputs are often considered as candidate inputs themselves. Also, while lagged correlation techniques exist they are less effective than traditional correlation calculations.

As mentioned, the tools can embody a Guided Evolutionary Simulated Annealing (GESA) assisted feature selection approach. The GESA-assisted feature selection (GAFS) approach strives to automate the selection of features in the setting of creating an optimal (or at least better) model. The GAFS methodology can build on Encapsulated Planning Optimization (EPO), to automate and optimize the feature selection process. Encapsulated Planning Optimization is described in commonly owned U.S. Provisional Application No. 60/487,035, filed Jul. 11, 2003 and entitled "ENCAPSULATED PLANNING OPTIMIZATION", which is incorporated herein in its entirety by reference.

EPO relies on an implementation of GESA which allows management of plan generation, evolution, and scoring to be encapsulated externally to GESA. GESA then manages only the optimization process itself. A set of model input features can be thought of as a plan to model the system. Thus, GAFS can leverage EPO, to find an optimal plan to model the system.

Three functions are performed by the external encapsulated planning module. The first task is generation of completely new plans from scratch, as requested by GESA. Second, procedures are implemented to modify or evolve new plans from old ones. In addition, a means to score each plan is provided. The analogous methods for GAFS are functions to generate new feature sets from scratch, to evolve new feature sets from old ones, and to score the effectiveness of each feature set.

According to one working embodiment, code has been developed to build model features sets from scratch, both randomly and with heuristic elements. This embodiment also incorporates a set of procedures to evolve new feature sets from old ones. The feature set scoring methodology in the embodiment is the standard $R^2$ error measure, obtained after training a model from the feature set under consideration. Features are also incorporated to look at average performance across an ensemble of models, to account for statistical variability inherent in the model training process. The GAFS approach can be used with Orthogonal Functional Link Net (OFLN) methodologies, and also is applicable to feature selection for any type of supervised learning, such as traditional Feed-Forward Backpropagation neural networks. OFLN is described in commonly owned U.S. application Ser. No. 10/374,406, filed Feb. 26, 2003 and entitled "AUTOMATIC NEURAL-NET MODEL GENERATION AND MAINTENANCE", which is incorporated herein in its entirety by reference.

Since large numbers of models are trained during the GAFS process, an attempt can be made to control resource intensive parameters such as training and test data set sizes and/or candidate input feature set size. Good results were obtained through the working embodiments, with a small data set size (~150 records) and a relatively large feature set size (~400 candidate input features). Results were obtained in tens of hours, on a relatively powerful PC (2.2 GHz CPU & 1 GB RAM). Depending on the ensemble sizes for score averaging, feature sets examined range from ~1000 per hour to ~10000 per hour. Measures to improve performance, such as improved evolution procedures and programmatic parallel processing are under investigation. For larger data sets with large feature sets, a sampling strategy might be adopted during an initial GAFS run, to range over the available input features, followed by a higher resolution GAFS run with a filtered subset of input features. For this type of application, seemingly long cycle times are tolerable due to (i) the promised reduction in manpower for generating models, and (ii) the possibility of more optimized models than can be produced with human efforts alone.

For complex real-world systems, it is often the case that a large number of features is related to the behaviors of the whole system. However, for a specific behavior of the system, it is seldom clear what exact set of features affect it. When a specific behavior is modeled, including features that affect other system behavior but irrelevant to this specific behavior often can degrade the quality of the model. If the features include categorical data and/or time lagged data, the problem is exacerbated because handling of them triggers creation of a large number of additional features, (for example, one feature for each category, or one feature for each time lag). For time lagged data, it is also difficult to know what lags should be used.

The GESA-Assisted Feature Selection (GAFS) approach can be introduced to automate and optimize a feature selection process in order to arrive at an optimal (or at least better) model of a system. This approach uses the GESA (Guided Evolutionary Simulated Annealing) optimization technique to search for an optimal set of features to include in modeling system, and is especially suitable for cases where categorical inputs and/or time lagged inputs are present. A typical implementation of this approach includes a number of modules, including an optimization module, a feature set generation module, a feature set evolution module and a feature set scoring module.

The feature set generation module randomly selects a set of features from the available ones. The feature set evolution module produces one or more alternative sets of features given an existing set of features and an optional parameter governing how much change is to be introduced in producing the alternative sets of features. The feature set scoring module evaluates the quality of a given set of features. The optimization module can drive the other modules to carry out search for optimal feature combination.

Figure 2:
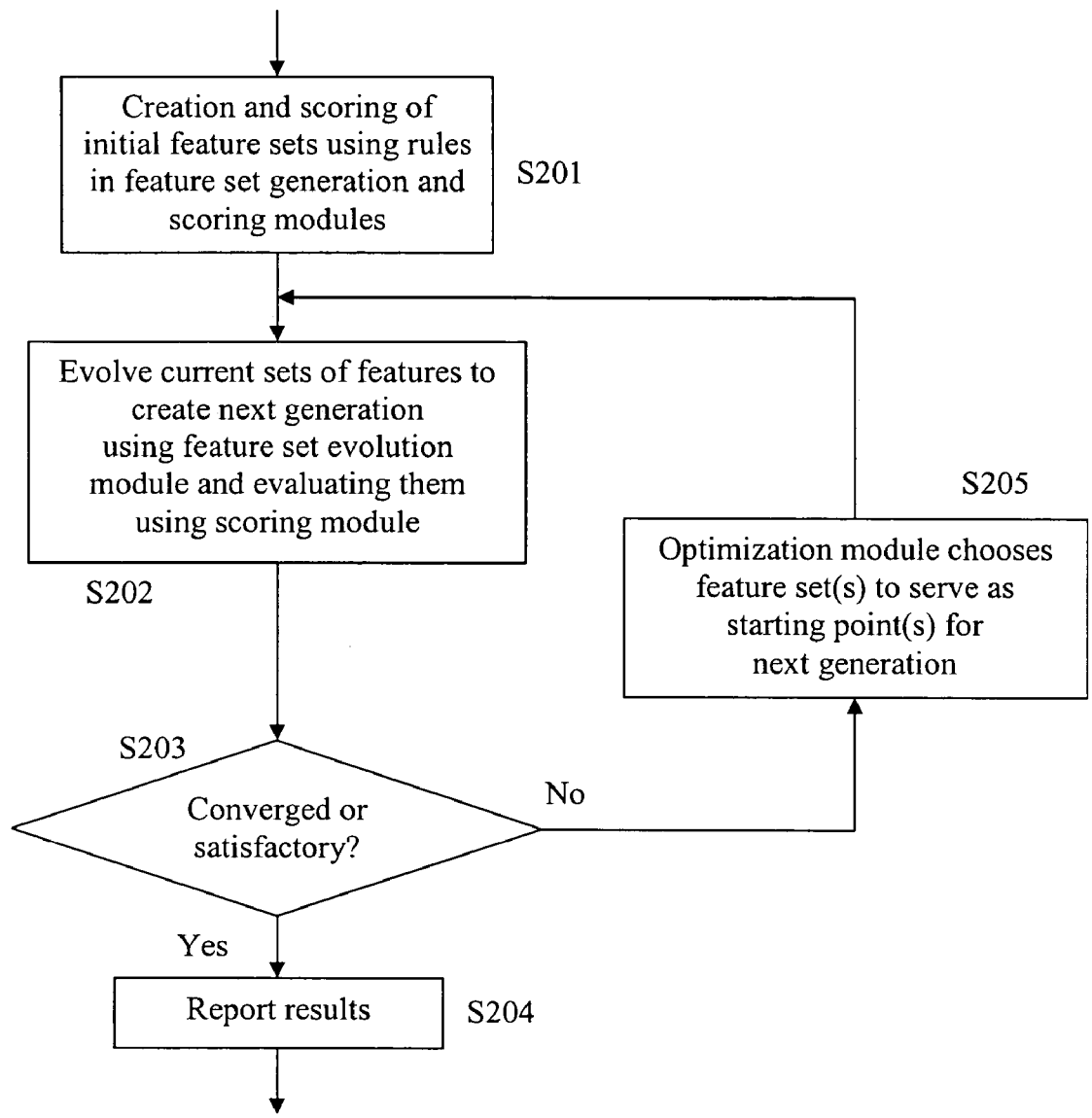
FIG. 2 shows a flow chart of a method for automated feature selection, according to another embodiment.

The search process can start with the optimization module instructing the feature set generation module to create initial sets of features. Optionally users may configure GAFS to use one or more results from a previous GAFS run as starting points. The number of initial feature sets is user-configurable. The initial feature sets are evaluated by the feature set scoring module, and the optimization module can instruct the feature set evolution module to generate another generation of feature sets based on existing ones and their scores. The optimization module uses the feature set scoring module to evaluate the new feature sets and to choose some to start the next generation. This process can continue until convergence or until the best feature set found so far is deemed satisfactory. The process, according to an exemplary GAFS embodiment, is illustrated in FIG. 2.

The feature set generation module picks one or more initial sets of features randomly and/or with certain rules and heuristics, and the feature set scoring module evaluates the initial sets of features (Step S201). In the presence of categorical data and/or time lagged data, it is also desirable to have the feature set generation module to automatically create the derived features.

The feature set evolution module introduces some changes to an existing feature set randomly and/or with certain rules and heuristics, in order to generate the next generation, and the feature set scoring module evaluates the modified sets of features (Step S202). Examples of changes may include adding/removing a feature, selecting a different time lag, etc.

The quality scores of modified feature sets are examined to determine whether any modified feature set has converged or is satisfactory (Step S203). If there is no modified feature set which has converged or is satisfactory (Step S203, No), the optimization module chooses some of the feature sets and passes the chosen feature sets to the feature set evolution module to serve as the starting point for the next generation (Step S205), and then Step S202 is repeated. After a satisfactory feature set is obtained (Step S203, Yes), results can be reported (Step S204).

One advantage of using the GAFS approach is that additional insights can easily be incorporated in the feature set generation and/or evolution modules. GAFS does not require a specific form of problem representation, such as bit string in the case of genetic algorithms which allows one to start with simple feature set generation and evolution modules such as a model which picks random features and to use this approach on a problem of reduced size (for example, with a small training sample). From the initial results, one can often identify candidates of important features and/or identify rules or heuristics for more effective feature set evolution. The gained experience can readily be used to adapt the feature set generation and/or evolution module to tackle the original problem more effectively.

The feature set scoring module is further discussed below. The general goal of GAFS is to create a quality model. One of the tasks is to define a measure of model quality. There are different measures such as system error or $R^2$. Depending on situation, one may select one or a combination to serve the purpose. In the case of neural net modeling, it is also customary to split the available data into training and validation sets and consider the results from both together in judging model quality.

When categorical features are present, a categorical feature is often converted into a set of features with each category being a feature itself. This conversion works well for a small number of categories but may introduce too many features for a large number of categories. GAFS takes this into account by introducing a penalty in the scoring module that increases with the selected number of features expanded from a single categorical feature.

For time lagged data, such as in modeling of time series, the time lags to be used are determined. This information is often unknown in advance. The most useful time lags also may not be continuous. But with GAFS, it is relatively easy to first try out a larger number of possible lags on a reduced data set to find a smaller set of more promising lag values and concentrate on them with the full scale problem. In practice, it is also desirable to keep the lag number small so that only recent history is used. Therefore, the GAFS approach introduces a penalty in the scoring module that increases with the lag number.

In one implementation of GAFS, the scoring is defined to be the following:

$$S = w1 * R^2_t + w2 * R^2_v - w3 * p_c - w4 * p_t$$

Where $R^2_t$ is the $R^2$ of the training set, $R^2_v$ is that of the validation set, $p_c$ is the penalty related to categorical data and $p_t$ is the penalty related to the time lagged data. The weights w1 through w4 can be determined based on user preference. This scoring function is maximized during the GAFS process.

Since the GAFS scoring module includes model quality, the model is created first. Since random initialization is used in the neural net training methodology, several models may be tested for the same configuration. This process maybe computationally intensive. Other parameters such as correlation may alternatively be used. However, with faster computers and fast modeling software such as OFLN technology, this approach becomes increasingly acceptable.

As an example, the GAFS approach was applied to a prediction application for an e-mail-based problem reporting system. The problem was to predict future e-mail volumes within the system based on past volumes, and on other past behavior of the system. The data for this problem contained 17 possible raw input features. Six of these features were categorical, with a total of 27 separate expansions of the underlying categories. Further, the problem involved time-series prediction. It was decided to consider up to ten lags for any input feature. With 17 apparent inputs, there were actually 380 candidate inputs for this modeling problem.

The test data was chosen to be the most recent two weeks of the available data. The procedure followed for this problem was to first do a range-finding GAFS run to determine the most effective features in the full candidate set. Then a second GAFS run was done to tune only the lags for the features found in the first GAFS run. This is one variation of the possible two-phase application of GAFS. Other variations might involve using only a sample of the train and test data in the range-finding run, for example.

FIG. 3 shows a table which summarizes the results of this study. The first run started with five model configurations with an average of 83 inputs, an average train score of 87.26, and an average test score of 97.97. Approximately 1400 model configurations were examined in the first run, and ensembles of 5 model trainings per configuration, with the total run time being about an hour on a 2.2 MHz PC. The number of inputs was reduced to 15, along with the improvement in scores shown in the table.

For the second run the ensemble size was increased to 10, and approximately 300 model configurations were examined. The final tuned result had a slightly decreased number of features, and slightly increased test score. The train score was slightly decreased as well, but in this type of time-series prediction it was thought advisable to emphasize prediction accuracy on recent data. As noted above the weighting factors in the scoring function can be used to emphasize train or test scores.

The above specific embodiments are illustrative, and many variations can be introduced on these embodiments without departing from the spirit of the disclosure or from the scope of the appended claims. Elements and/or features of different illustrative embodiments may be combined with and/or substituted for each other within the scope of the disclosure and the appended claims.

For example, additional variations may be apparent to one of ordinary skill in the art from reading the following commonly owned applications, which are incorporated herein in their entireties by reference:

U.S. Provisional Application No. 60/486,734, filed Jul. 11, 2003 and entitled "GESA ASSISTED FEATURE SELECTION";

U.S. application Ser. No. 10/418,659, filed Apr. 18, 2003 and entitled "PROCESSING MIXED NUMERIC AND/OR NON-NUMERIC DATA";

U.S. application Ser. No. 10/412,993, filed Apr. 14, 2003 and entitled "METHOD AND APPARATUS FOR DISCOVERING EVOLUTIONARY CHANGES WITHIN A SYSTEM"; and U.S. application Ser. No. 10/615,885, filed Jul. 8, 2003 and entitled "HIERARCHICAL DETERMINATION OF FEATURE RELEVANCY".

The invention claimed is:

1. A computer-implemented method for automated feature selection, comprising:

at one or more processors coupled to a memory:
(a) initially selecting a first selection of one or more feature sets using one or more rules for non-random selection;
(b) determining quality scores for the feature sets;
(c) selecting by optimization a second selection of feature sets according to the quality scores;
(d) modifying the feature sets selected in the second selection;
(e) determining quality scores for the modified feature sets;
wherein steps (a), (b), (c) and (e) are functionally and structurally encapsulated together and fully separated from step (d); and
(f) generating a report comprising results of the automated feature selection.

2. The method of claim 1, further comprising repeating steps (c) through (e) until a quality score for a further modified feature sets reaches a satisfactory value.

3. The method of claim 1, further comprising repeating steps (c) through (e) until a quality score for a further modified feature sets converges.

4. The method of claim 1, wherein the one or more feature sets include categorical data.

5. The method of claim 1, wherein the one or more feature sets include time-lagged data.

6. The method of claim 1, wherein the one or more feature sets include categorical data and time-lagged data.

7. The method of claim 1, wherein the feature sets selected in the second selection are modified using heuristics.

8. The method of claim 1, wherein the feature sets selected in the second selection are modified by applying evolution rules.

9. The method of claim 1, wherein the feature sets selected in the second selection are modified by adding or removing one or more features.

10. The method of claim 1, wherein the feature sets selected in the second selection are modified by applying Guided Evolutionary Simulated Annealing assisted feature selection.

11. The method of claim 6, wherein quality scores for the modified feature sets are determined according to the following equation:

$$S = W_1 * R^2_t + W_2 * R^2_v - W_3 * p_c - W_4 * p_t$$

wherein:
$R^2_t$ is an $R^2$ error measure of a training set of features;
$R^2_v$ is an $R^2$ error measure of a validation set of features;
$p_c$ is a penalty value related to categorical data;
$p_t$ is a penalty value related to time lagged data; and
$W_1$ through W4 are selected by a user;
and wherein the generated report includes a number of features, a train score, and a quality score.

12. An apparatus for automated feature selection, comprising:

a software program embodied in a computer readable storage medium, the software program, when executed by a processor, operable to:
(a) initially select a first selection of one or more feature sets using one or more rules for non-random selection;
(b) determine quality scores for the feature sets;
(c) select by optimization a second selection of one or more feature sets according to the quality scores;
(d) modify the feature sets selected in the second selection;
(e) determine quality scores for the modified feature sets;
wherein steps (a), (b), (c) and (e) are functionally and structurally encapsulated together and fully separated from step (d); and
(f) generate a report comprising results of the automated feature selection.

13. The apparatus of claim 12, wherein the software program, when executed by a processor, is further operable to repeat steps (c) through (e) until a quality score for a further modified feature sets reaches a satisfactory value.

14. The apparatus of claim 12, wherein the software program, when executed by a processor, is further operable to repeat steps (c) through (e) until a quality score for a further modified feature sets converges.

15. The apparatus of claim 12, wherein the one or more feature sets include categorical data.

16. The apparatus of claim 12, wherein the one or more feature sets include time-lagged data.

17. The apparatus of claim 12, wherein the one or more feature sets include categorical data and time-lagged data.

18. The apparatus of claim 12, wherein the feature sets selected in the second selection are modified using heuristics.

19. The apparatus of claim 12, wherein the feature sets selected in the second selection are modified by applying evolution rules.

20. The method of claim 12, wherein the feature sets selected in the second selection are modified by adding or removing one or more features.

21. The method of claim 12, wherein the feature sets selected in the second selection are modified by applying Guided Evolutionary Simulated Annealing assisted feature selection.

22. The apparatus of claims 17, wherein quality scores for the modified feature sets are determined according to the following equation:

$$S = W_1 * R^2_t + W_2 * R^2_v - W_3 * p_c - W_4 * p_t$$

wherein:
$R^2_t$ is an $R^2$ error measure of a training set of features;
$R^2_v$ is an $R^2$ error measure of a validation set of features;
$p_c$ is a penalty value related to categorical data;
$p_t$ is a penalty value related to time lagged data; and
$W_1$ through W4 are selected by a user;
and wherein the generated report includes a number of features, a train score, and a quality score.

23. The method of claim 1, wherein the second selection of one or more feature sets according to the quality scores is selected from the one or more feature sets initially selected.

24. The method of claim 1, wherein selecting a second selection of feature sets according to the quality scores comprises removing a feature from the first selection of one or more feature sets.

25. The apparatus of claim 12, wherein the second selection of one or more feature sets according to the quality scores is selected from the one or more feature sets initially selected.

26. The apparatus of claim 12, wherein selecting a second selection of feature sets according to the quality scores comprises removing a feature from the first selection of one or more feature sets.

27. A computer-implemented method for automated feature selection in Guided Evolutionary feature selection (GAFS) plan generation, comprising:

at one or more processors coupled to a memory, implementing Guided Evolutionary Simulated Annealing (GESA) to:
  (a) initially select, using Encapsulated Planning Optimization (EPO) feature set generation, a first selection of one or more feature sets using one or more rules for non-random selection;
  (b) determine EPO feature set scoring quality scores based on user-identified weights for the feature sets;
  (c) select by optimization, using GESA assisted feature selection, a second selection of feature sets according to the quality scores;
  (d) modify using EPO feature set evolution the feature sets selected in the second selection;
  (e) determine EPO feature set scoring for the quality scores for the modified feature sets; and
  wherein steps (a), (b), (c) and (e) are functionally and structurally encapsulated together (EPO) and fully separated from step (d) (GESA); and
  generate a report comprising results of the automated feature selection.

28. An apparatus for automated feature selection in Guided Evolutionary feature selection (GAFS) plan generation, comprising:
  a software program embodied in a computer readable storage medium, the software program, when executed by a processor, implementing Guided Evolutionary Simulated Annealing (GESA) to:
    (a) initially select, using Encapsulated Planning Optimization (EPO) feature set generation, a first selection of one or more feature sets using one or more rules for non-random selection;
    (b) determine EPO feature set scoring quality scores based on user-identified weights for the feature sets;
    (c) select by optimization, using GESA assisted feature selection, a second selection of feature sets according to the quality scores;
    (d) modify using EPO feature set evolution the feature sets selected in the second selection;
    (e) determine EPO feature set scoring for quality scores for the modified feature sets; and
    wherein steps (a), (b), (c) and (e) are functionally and structurally encapsulated together (EPO) and fully separated from step (d) (GESA); and
  the software program further generating a report comprising results of the automated feature selection.

29. A computer-implemented method for automated feature selection, comprising:
  at one or more processors coupled to a memory:
    (a) initially selecting a first selection of one or more feature sets using one or more rules for non-random selection, the one or more feature sets including categorical data and time-lagged data;
    (b) determining quality scores for the feature sets;
    (c) selecting by optimization a second selection of feature sets according to the quality scores;
    (d) modifying the feature sets selected in the second selection;
    (e) determining quality scores for the modified feature sets according to the following equation:

$$S = W_1 * R^2_t + W_2 * R^2_v - W_3 * p_c - W_4 * p_t$$

wherein:
      $R^2_t$ is an $R^2$ error measure of a training set of features;
      $R^2_v$ is an $R^2$ error measure of a validation set of features;
      $p_c$ is a penalty value related to categorical data;
      $p_t$ is a penalty value related to time lagged data; and
      $W_1$ through W4 are selected by a user; and
      wherein steps (a), (b), (c) and (e) are functionally and structurally encapsulated together and fully separated from step (d); and
  generating a report comprising results of the automated feature selection.

30. An apparatus for automated feature selection, comprising:
  a software program embodied in a computer readable storage medium, the software program, when executed by a processor, operable to:
    (a) initially select a first selection of one or more feature sets using one or more rules for non-random selection, the one or more feature sets including categorical data and time-lagged data;
    (b) determine quality scores for the feature sets;
    (c) select by optimization a second selection of one or more feature sets according to the quality scores;
    (d) modify the feature sets selected in the second selection;
    (e) determine quality scores for the modified feature sets according to the following equation:

$$S = W_1 * R^2_t + W_2 * R^2_v - W_3 * p_c - W_4 * p_t$$

wherein:
      $R^2_t$ is an $R^2$ error measure of a training set of features;
      $R^2_v$ is an $R^2$ error measure of a validation set of features;
      $p_c$ is a penalty value related to categorical data;
      $p_t$ is a penalty value related to time lagged data; and
      $W_1$ through W4 are selected by a user; and
      wherein steps (a), (b), (c) and (e) are functionally and structurally encapsulated together and fully separated from step (d); and
  generating a report comprising results of the automated feature selection.

* * * * *